US012275382B2

(12) United States Patent
Belling-Hoffmann et al.

(10) Patent No.: US 12,275,382 B2
(45) Date of Patent: Apr. 15, 2025

(54) VALVE DEVICE FOR A SYSTEM, IN PARTICULAR A BRAKING SYSTEM FOR A VEHICLE, AND SYSTEM, IN PARTICULAR BRAKING SYSTEM FOR A VEHICLE

(71) Applicant: Knorr-Bremse Systeme Fuer Nutzfahrzeuge GmbH, Munich (DE)

(72) Inventors: Michael Belling-Hoffmann, Renningen (DE); Alexander Matt, Bruchsal (DE); Christian Kaufmann, Sindelfingen (DE); Dominikus Drayss, Wallduern (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 280 days.

(21) Appl. No.: 18/049,336

(22) Filed: Oct. 25, 2022

(65) Prior Publication Data
US 2023/0132284 A1     Apr. 27, 2023

(30) Foreign Application Priority Data
Oct. 27, 2021   (DE) .................... 10 2021 127 910.0

(51) Int. Cl.
*B60T 13/68*    (2006.01)
*B60T 15/02*    (2006.01)
(Continued)

(52) U.S. Cl.
CPC .......... *B60T 13/683* (2013.01); *B60T 15/027* (2013.01); *G05D 16/2013* (2013.01); *H02H 3/08* (2013.01);
(Continued)

(58) Field of Classification Search
CPC ....... B60T 13/68; B60T 13/683; B60T 13/686
See application file for complete search history.

(56) References Cited

U.S. PATENT DOCUMENTS

2020/0406879 A1\* 12/2020 Hecker ................. B60T 13/683
2021/0269048 A1\* 9/2021 Herges ................. B60T 17/221
(Continued)

FOREIGN PATENT DOCUMENTS

DE   102018103605 A1   8/2019
DE   102018121957 A1   3/2020
DE   102018121960 A1   3/2020

*Primary Examiner* — Jared Fureman
*Assistant Examiner* — Christopher J Clark
(74) *Attorney, Agent, or Firm* — NORTON ROSE FULBRIGHT US LLP; Gerard A. Messina

(57) ABSTRACT

A valve-device (VD) for a vehicle-braking-system (VBS), and a VBS. A VD for a VBS, having first/second control-units (CU), which are electrically connectable to the VD, which includes a valve-unit (VU) with an actuator for actuating the VU, a valve housing (VH) for the VU, and an error protection module (EPM) outside the VH. The EPM includes first/second supply-ports (SP) for electrical attachment to the first/second CUs, first/second main-ports (MP) for electrical attachment to the first/second CUs, a first connection port (CP) electrically connected to the first/second SPs, for electrical connection to the actuator, a second CP electrically connected to the first/second MPs, for electrical connection to the actuator, first and second electric protective circuits (EPC). The first EPC is electrically connected between the first/second SPs, and the first CP. The second EPC is electrically connected between the second CP and the first/second MPs. An EPC includes an electrical fuse-device and/or a diode-element connected in series to the respective supply/main ports.

11 Claims, 2 Drawing Sheets

(51) Int. Cl.
*G05D 16/20* (2006.01)
*H02H 3/08* (2006.01)

(52) U.S. Cl.
CPC ... *B60T 2270/402* (2013.01); *B60T 2270/413* (2013.01)

(56) References Cited

U.S. PATENT DOCUMENTS

2021/0347347 A1* 11/2021 Cho .................. B60T 13/74
2023/0128573 A1* 4/2023 Belling-Hoffmann ......................
B60T 15/027
303/15

\* cited by examiner

VALVE DEVICE FOR A SYSTEM, IN PARTICULAR A BRAKING SYSTEM FOR A VEHICLE, AND SYSTEM, IN PARTICULAR BRAKING SYSTEM FOR A VEHICLE

RELATED APPLICATION INFORMATION

The present application claims priority to and the benefit of German patent application no. 10 2021 127 910.0, which was filed in Germany on Oct. 27, 2021, the disclosure of which is incorporated herein by reference.

FIELD OF THE INVENTION

The present invention relates to a valve device for a system, in particular a braking system for a vehicle, and to a system or braking system for a vehicle, in particular an electronic braking system.

BACKGROUND INFORMATION

During automated or autonomous driving of vehicles of all types, redundancies, for example, have to be created. Said redundancies have to be configured in particular in such a manner that the vehicle cannot pass into a critical safety state or an uncontrollable state. For example, there has been a move to placing systems, for example the electrical braking system EBS or ABS, at multiple points in the vehicle. Another option may consist in supplementing the system with similar subsystems which can reproduce the functionality. In the event of error the defective system can be switched off and the second error-free system can take on the task and thus produce the redundancy. In order, for example, to be able to produce an electrical braking system in utility vehicles redundantly, in particular a number of pressure control valves on each axle or on a respective wheel would therefore be doubled.

SUMMARY OF THE INVENTION

Against this background, it is the object of the present invention to provide an improved valve device for a system for a vehicle and an improved system for a vehicle.

This object may be achieved by a valve device for a system for a vehicle and by a braking system for a vehicle in accordance with the main claims.

According to embodiments, in particular an error protection module can be provided for a pressure control valve, for example for dual use or multiple use for a vehicle braking system to be configured redundantly. In this connection, electric protective circuits that each comprise an electrical fuse device and a diode element can be integrated in a dedicated error protection module of the pressure control valve. In a braking system for a vehicle, in particular a pressure control valve can therefore be used by two control units, in a manner electrically protected by the fuse devices, in order to produce redundancy in the braking system.

Advantageously, according to embodiments, in particular a cost-effective multiple system can be provided, with it being possible to avoid doubling pressure control valves. It is therefore possible not only to save costs but also construction space and an outlay on wiring, and therefore such a valve device for a braking system can be integrated in a simple manner in the vehicle. An integration of the protective circuits, of which at least one is configured, for example, as a combination of at least one fuse and/or at least one diode, in a valve, in particular a pressure control valve, has the advantage that vehicle wiring for the dual use is facilitated. For example, Y cables, which may be susceptible to corrosion, can be dispensed with. It is possible to adapt the pressure control valve or, more precisely, the error protection module in a simple manner via suitable plug-in connections. Furthermore, in particular via such an external module, corrosion on electrical connections can be minimized or prevented.

The arrangement of the fuse devices in the error protection module, which is separate or is separate from the valve unit and which, depending on requirements, can be positioned relative to the valve unit, with a distance between the valve unit and the error protection module being able to be selected in a suitable way, is particularly advantageous. The separate error protection module is furthermore advantageous since a construction space in the vicinity of the valve unit in a vehicle may be limited because the valve device can be positioned in the vicinity of the axle or in the vicinity of the wheel. In addition, a new development of pressure control valves with integrated fuses and diodes can be avoided. The valve unit of the valve device can be exchanged or varied independently of the error protection module.

A valve device for a system, in particular a braking system for a vehicle, wherein the system has a first control unit and a second control unit, wherein the control units are electrically connectable or connected to the valve device, has the following features:

a valve unit for setting a pressure of a working medium for the system, wherein the valve unit has at least one actuator for actuating the valve unit;

a valve housing for accommodating the valve unit; and an error protection module, which is arranged outside the valve housing, wherein the error protection module has a first supply port for the electrical attachment to the first control unit, a second supply port for the electrical attachment to the second control unit, a first main port for the electrical attachment to the first control unit, a second main port for the electrical attachment to the second control unit, a first connection port, which is electrically connected to the first supply port and to the second supply port, for the electrical connection to the actuator, a second connection port, which is electrically connected to the first main port and to the second main port, for the electrical connection to the actuator, a first electric protective circuit and a second electric protective circuit, wherein the first protective circuit is electrically connected between the first supply port and the second supply port, on the one hand, and the first connection port, on the other hand, wherein the second protective circuit is electrically connected between the second connection port, on the one hand, and the first main port and the second main port, on the other hand, wherein at least one of the protective circuits has at least one electrical fuse device and/or at least one diode element that are connected in series to the respective supply port/main port.

The vehicle can be a motor vehicle, in particular a utility vehicle, for example a truck or the like. The system can be configured as an electronic braking system or electro-pneumatic braking system. The first control unit can be a primary control unit, with the second control unit being able to be a redundant control unit. The first control unit can be assigned to a first function or assistance function of the vehicle or of the braking system, with the second control unit being able to be assigned to a second function or assistance function of the vehicle or of the braking system. The device can be configured as a pressure control valve. The valve unit and therefore the valve device can have at least one solenoid valve. The actuator can comprise resistive inductance. The diode element can have a diode, a semiconductor diode or the like. The fuse device can have a safety fuse or another electrical fuse, for example even a self-resetting fuse or a multiple fuse. The error protection module can be arranged here adjoining or adjacent to the valve unit in order to prevent interruptions in the connection ports.

According to one embodiment, the actuator can be attachable to a first electric supply potential of the first control unit via the first supply port and the first connection port. The actuator can be attachable here to a second electric supply potential of the second control unit via the second supply port and the first connection port. The actuator can be attachable here to a common electric ground potential of the control units via the second connection port and the first main port or via the second connection port and the second main port. Such an embodiment affords the advantage that, despite the use of a common ground potential for the at least one actuator, a redundant activation of the valve device can be realized in a manner protected against errors, such as, for example, short circuits and the like.

The fuse device of the first protective circuit can also be connected between the first supply port and the first connection port. The diode element of the first protective circuit can be connected here between the second supply port and the first connection port. The fuse device of the second protective circuit can be connected here between the second connection port and the first main port. Furthermore, the diode element of the second protective circuit can be connected between the second connection port and the second main port. Such an embodiment affords the advantage of it being possible, with a redundant configuration or activation, for reliable protection against error situations to be achieved.

In particular, a forward direction of the diode element of the first protective circuit can run from the second supply port to the first connection port. A forward direction of the diode element of the second protective circuit can run here from the second connection port to the second main port. Such an embodiment affords the advantage that a redundant operation is made possible by two control units in a safe and error-protected manner.

In addition, the valve unit can have at least one further actuator for actuating the valve unit. The second connection port of the error protection module can be electrically connectable or connected here to the further actuator. The error protection module can have at least one third supply port for the electrical attachment to the first control unit, at least one fourth supply port for the electrical attachment to the second control unit, at least one further connection port, which is electrically connected to the third supply port and to the fourth supply port, for the electrical connection to the further actuator, and at least one further protective circuit. The further protective circuit can be electrically connected between the third supply port and the fourth supply port, on the one hand, and the further connection port, on the other hand. The actuator of the valve unit can be, for example, part of an inlet valve of the valve device, wherein the further actuator can be, for example, part of an outlet valve of the valve device. Such an embodiment affords the advantage of it being possible to protect any desired number of actuators of the valve device with minimal outlay.

The fuse device of the further protective circuit can be connected here between the third supply port and the further connection port. The diode element of the further protective circuit can be connected here between the fourth supply port and the further connection port. A forward direction of the diode element of the further protective circuit can run from the fourth supply port to the first connection port. Such an embodiment affords the advantage that reliable protection against error situations can be realized for a robust redundant operation of a valve device with a plurality of actuators.

Furthermore, the further actuator can be attachable here to the first electric supply potential via the third supply port and the further connection port. The further actuator can be attachable to the second electric supply potential via the fourth supply port and the further connection port. Such an embodiment affords the advantage that the further actuator can also be incorporated with minimal outlay in the fuse protection and therefore protected.

According to one embodiment, the error protection module can be configured to be exchangeable. Such an embodiment affords the advantage that, after an error situation has occurred, it is possible to simply exchange one fuse device or a plurality of fuse devices to restore the functioning capability of the error protection module.

The fuse devices of the protective circuits can also be arranged exchangeably in the protective circuits. Additionally or alternatively, at least one of the protective circuits can be exchangeable. Such an embodiment affords the advantage that, after an error situation has occurred, it is possible to cost-effectively exchange one fuse device or a plurality of fuse devices or an entire protective circuit to restore the functioning capability of the protective circuits.

Furthermore, the valve device can have cut-resistant, fireproof and/or corrosion-resistant cables for connecting the valve unit and the error protection module to one another.

A system, in particular a braking system for a vehicle, comprises the following features:

an embodiment of the abovementioned valve device; and the first control unit and the second control unit, wherein the control units are electrically connectable or connected to the valve device.

The valve device can be connectable or connected to the first control unit and to the second control unit by electric lines. The braking system can also have at least one further valve device.

Exemplary embodiments of the approach presented here will be explained in more detail in the description below with reference to the figures.

DETAILED DESCRIPTION

Figure 1:
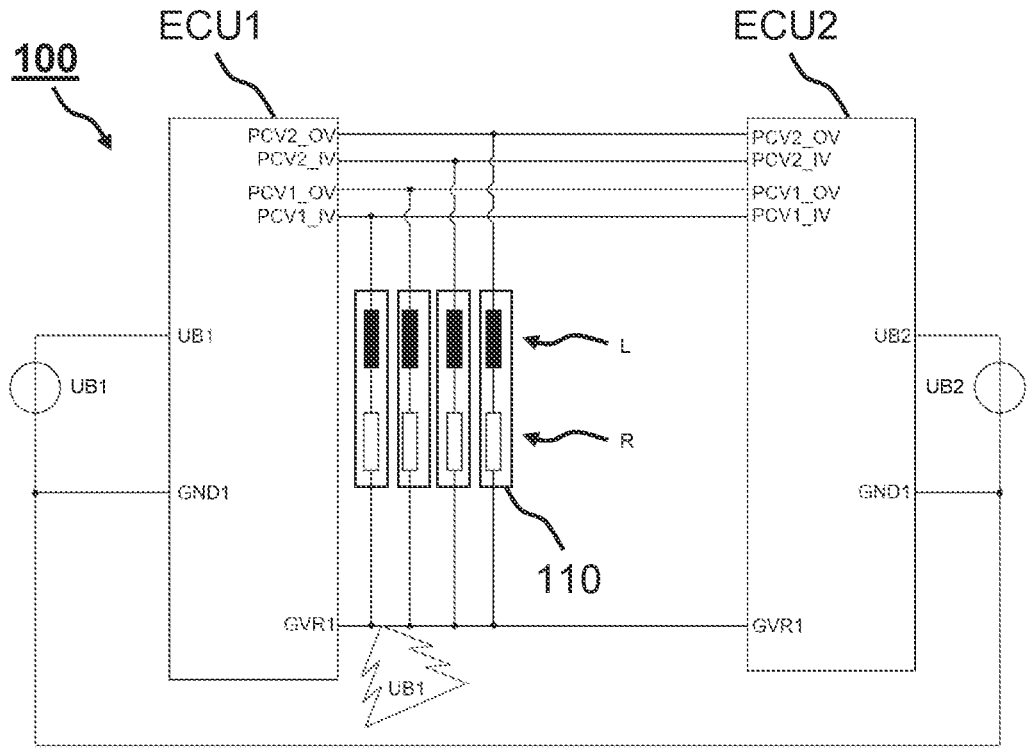
FIG. 1 shows a schematic illustration of a braking system as the system.

FIG. 1 shows a schematic illustration of a braking system 100 as the system. Of the braking system 100, here in particular a first control unit or a primary control unit ECU1, a second control unit or redundant control unit ECU2 and a plurality of actuators 110 of pressure control valves (PCV) are shown. A plurality of electronic control units, here the first control unit ECU1 and the second control unit ECU2, for braking control use common pressure control valves with the actuators 110 in order to produce redundancy in the braking system 100.

By way of example, two pressure control valves each having two actuators 110 are shown here. In the schematic illustration of FIG. 1, each of the actuators 110 is shown as an equivalent circuit diagram of an inductance L and a resistance R. The first control unit ECU1 comprises ports PCV1_IV, PCV1_OV, PCV2_IV, PCV2_OV and GVR1 for the electrical attachment to the actuators 110, and ports UB1 and GND1 for the attachment to a first electrical voltage source. The second control unit ECU2 comprises ports PCV1_IV, PCV1_OV, PCV2_IV, PCV2_OV and GVR1 for the electrical attachment to the actuators 110, and ports UB2 and GND1 for the attachment to a second electrical voltage source.

Furthermore, a short circuit of UB1 to the jointly used actuator ground is shown by way of example. In some error situations, a state may occur in which neither the first control unit ECU1 nor the second control unit ECU2 can activate the actuators 110. In the event of a short circuit of UB1 or UB2 to the jointly used actuator ground, an activation is no longer possible. A further possible error situation is the end of the actuation after UB1 or UB2. In this error situation, an ABS control, for example, is therefore neither possible by the first control unit ECU1 nor by the second control unit ECU2. Under some circumstances, redundancy of a primary braking system is therefore not provided.

Figure 2:
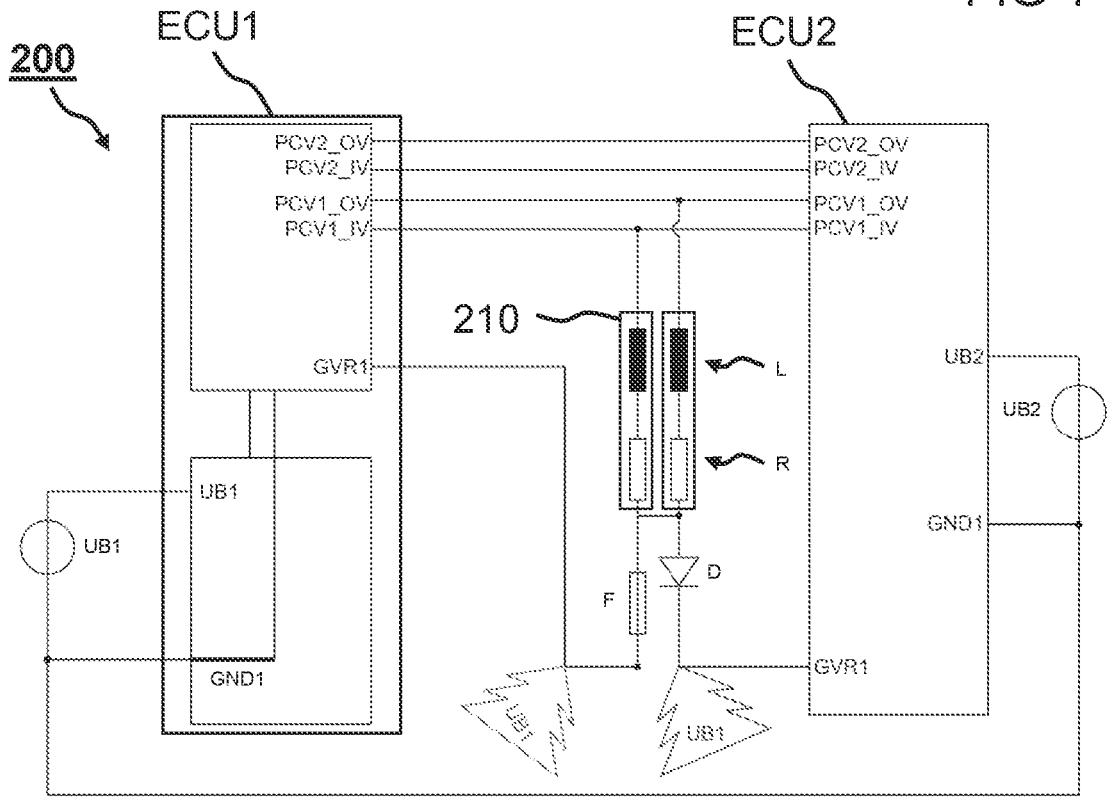
FIG. 2 shows a schematic illustration of a braking system as the system.

FIG. 2 shows a schematic illustration of a braking system 200 as the system. The braking system 200 in FIG. 2 corresponds here to the braking system from FIG. 1 with the exception that only one pressure control valve having two actuators 210 is provided, with a fuse F and a diode D additionally being provided for protecting the pressure control valve. A plurality of electronic control units, here the first control unit ECU1 and the second control unit ECU2, for braking control use a common pressure control valve which has the two actuators 210 in order to produce redundancy in the braking system 200. In the event of a short circuit of UB1 at the actuator ground GVR1 of the first control unit ECU1, the fuse F is intended to trigger and thus to separate the ground line GVR1, which is short-circuited. The diode D is intended to provide protection in the event of a short circuit of UB1 on the side of the second control unit ECU2.

Figure 3:
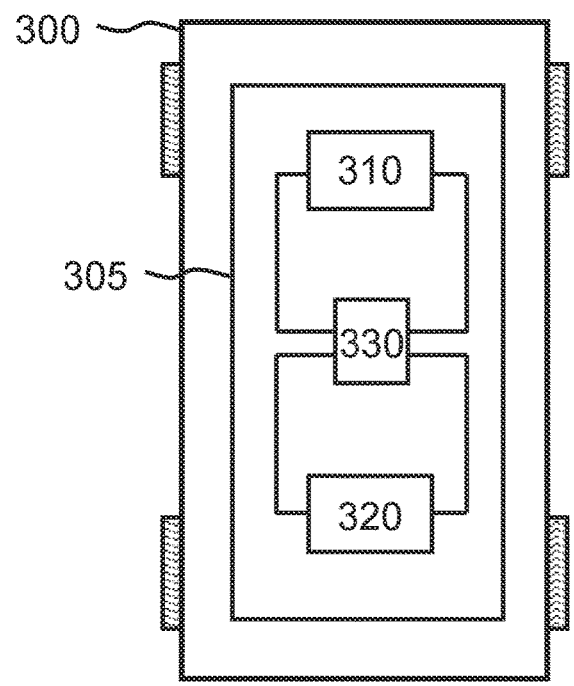
FIG. 3 shows a schematic illustration of a vehicle with a braking system according to an exemplary embodiment.

FIG. 3 shows a schematic illustration of a vehicle 300 having a braking system 305 as the system according to an exemplary embodiment. The braking system 305 can resemble the braking system from FIG. 2. The braking system 305 comprises a first control unit 310, a second control unit 320 and a valve device 330. The control units 310 and 320 are electrically connected to the valve device 330. The valve device 330 will be discussed in more detail below.

Figure 4:
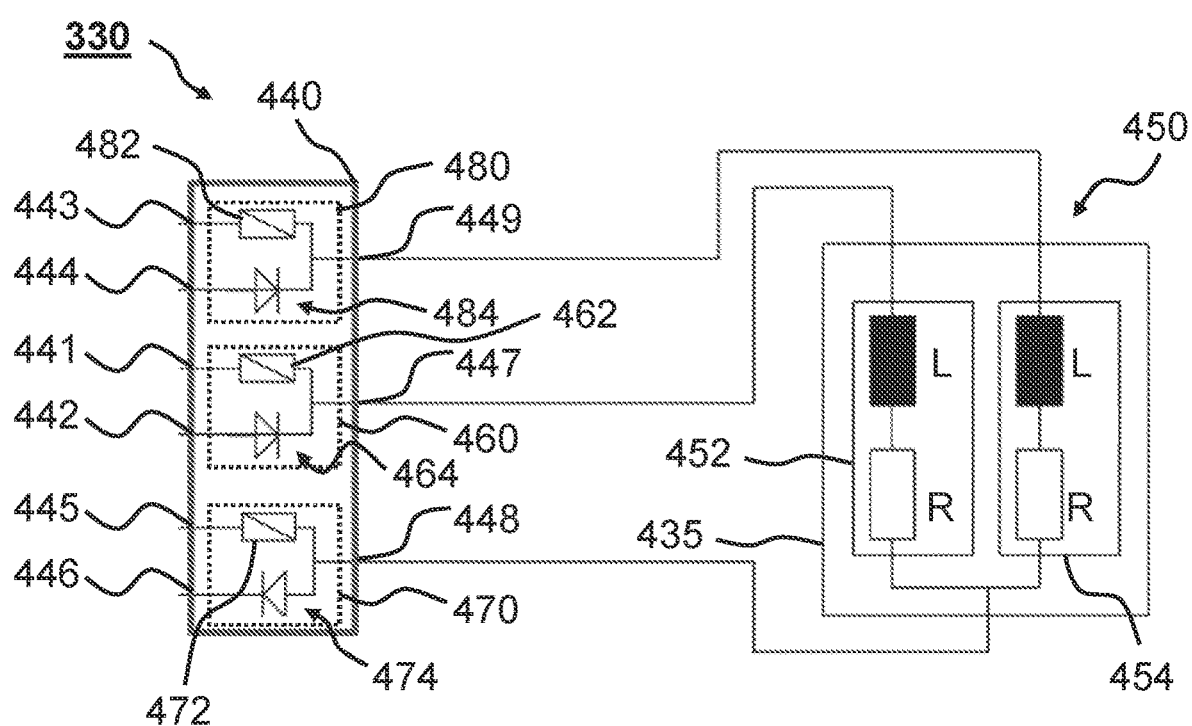
FIG. 4 shows a schematic illustration of an exemplary embodiment of a valve device for a braking system.

FIG. 4 shows a schematic illustration of an exemplary embodiment of a valve device 330 for a braking system as the system. The braking system corresponds to or here resembles the braking system from FIG. 3. The braking system therefore comprises a first control unit and a second control unit that are electrically connectable or connected to the valve device 330. The valve device 330 corresponds to or resembles the valve device from FIG. 3. In particular, the valve device 330 is configured as a pressure control valve (PCV) for the braking system.

The valve device 330 comprises an error protection module 440, a valve unit 450 and a valve housing 435. The valve housing 435 is shaped to accommodate the valve unit 450. The valve unit 450 is configured to set a pressure of a working medium for the braking system. The valve unit 450 comprises at least one actuator 452 for actuating the valve unit 450. The valve unit 450 is arranged within the valve housing 435. The at least one actuator 452 comprises a resistive inductance, as is shown in the illustration of FIG. 4 by an equivalent circuit diagram with an inductance L and a resistance R.

The error protection module 440 is arranged outside the valve housing 435. The error protection module 440 comprises a first supply port 441, a second supply port 442, a first main port 445, a second main port 446, a first connection port 447, a second connection port 448, a first electric protective circuit 460 and a second electric protective circuit 470.

The first supply port 441 serves for the electrical attachment to the first control unit of the braking system. The second supply port 442 serves for the electrical attachment to the second control unit of the braking system. The first main port 445 serves for the electrical attachment to the first control unit. The second main port 446 serves for the electrical attachment to the second control unit. The first connection port 447 is electrically connected to the first supply port 441 and to the second supply port 442 and serves for the electrical connection to the actuator 452. The second connection port 448 is electrically connected to the first main port 445 and to the second main port 446 and serves for the electrical connection to the actuator 452.

The first protective circuit 460 is electrically connected between the first supply port 441 and the second supply port 442, on the one hand, and the first connection port 447, on the other hand. The first protective circuit 460 comprises an electrical fuse device 462 and a diode element 464 that are connected in series to the respective supply port/main port. The second protective circuit 470 is electrically connected between the second connection port 448, on the one hand, and the first main port 445 and the second main port 446, on the other hand. The second protective circuit 470 comprises an electrical fuse device 472 and a diode element 474 that are connected in series to the respective supply port/main port. In particular, the fuse devices 462 and 472 are configured to trigger in an electric error situation in the braking system, for example in the event of a short circuit, and to prevent the error situation. Furthermore, the diode elements 464 and 474 are configured to also prevent an impermissible current flow in such an error situation.

According to one exemplary embodiment, the fuse device 462 of the first protective circuit 460 is connected between the first supply port 441 and the first connection port 447. The diode element 464 of the first protective circuit 460 is connected here between the second supply port 442 and the first connection port 447. Furthermore, the fuse device 472 of the second protective circuit 470 is connected between the second connection port 448 and the first main port 445. The diode element 474 of the second protective circuit 470 is connected here between the second connection port 448 and the second main port 446. For example, according to this exemplary embodiment, a forward direction of the diode element 464 of the first protective circuit 460 runs from the second supply port 442 to the first connection port 447. A forward direction of the diode element 474 of the second protective circuit 470 also runs, for example, from the second connection port 448 to the second main port 446.

In particular, the actuator 452 is attachable to a first electric supply potential of the first control unit via the first supply port 441 and the first connection port 447. The actuator 452 is also attachable to a second electric supply potential of the second control unit via the second supply port 442 and the first connection port 447. Furthermore, the actuator 452 is attachable to a common electric ground potential of the control units via the second connection port 448 and the first main port 445 or via the second connection port 448 and the second main port 446.

According to a further exemplary embodiment, the valve unit 450 comprises at least one further actuator 454 for actuating the valve unit 450. The second connection port 448 of the error protection module 440 is electrically connected here to the further actuator 454. Furthermore, according to this exemplary embodiment, the error protection module 440 comprises at least one third supply port 443 for the electrical attachment to the first control unit, at least one fourth supply port 444 for the electrical attachment to the second control unit, at least one further connection port 449, which is electrically connected to the third supply port 443 and to the fourth supply port 444, for the electrical connection to the further actuator 454, and at least one further protective circuit 480. The further protective circuit 480 is electrically connected between the third supply port 443 and the fourth supply port 444, on the one hand, and the further connection port 449, on the other hand. In particular, the fuse device 482 of the further protective circuit 480 is connected here between the third supply port 443 and the further connection port 449. The diode element 484 of the further protective circuit 480 is connected between the fourth supply port 444 and the further connection port 449. Merely by way of example, the further protective circuit 480 is identical to the first protective circuit 460 and/or to the second protective circuit 470. For example, the further actuator 454 is attachable to the first electric supply potential via the third supply port 443 and the further connection port 449. The further actuator 454 is attachable to the second electric supply potential via the fourth supply port 444 and the further connection port 449. The further actuator 454 is attachable to the common electric ground potential of the control units via the second connection port 448 and the first main port 445 or via the second connection port 448 and the second main port 446.

The pressure control valve or the valve device 330 comprises, for example, an inlet valve which has the actuator 452, and an outlet valve which has the further actuator 454, the actuators 452 and 454 being attachable or attached to a jointly used ground. Activation lines or supply lines are guided separately from the control units via the error protection module 440 to the actuators 452 and 454.

According to one exemplary embodiment, the error protection module 440 is configured to be exchangeable. Additionally or alternatively, the fuse devices 462, 472 and optionally 482 of the protective circuits 460, 470 and optionally 480 are arranged exchangeably in the protective circuits 460, 470 and optionally 480. The error protection module 440 and/or each of the fuse devices 462, 472 and optionally 482 can therefore be exchanged or renewed individually if this is required.

A diagonal arrangement of the fuse devices 462, 472 and optionally 482 and diode elements 464, 474 and optionally 484 would also be conceivable, and therefore there is a fuse device and a diode element in the current circuit of each individual control unit, e.g. in each case one fuse device at the first supply port 441 and at the second main port 446, and in each case one diode element at the second supply port 442 and at the first main port 445.

Exemplary embodiments and advantages thereof are summarized below with reference to the above-described figures and explained briefly using other words.

A remedy in respect of, for example, the error source mentioned with reference to FIG. 1 can therefore be provided by the protective circuits 460, 470 and optionally 480 in order to avoid further error sources. For example, the first control unit 310 (equivalent to the first control unit ECU1) can unrestrictedly transfer control of the valve device 330 to the second control unit 320 (equivalent to the second control unit ECU2). The first control unit 310 can unrestrictedly use the valve device 330 or the actuator 452 or actuators 452 and 454 thereof. The protective circuits 460, 470 and optionally 480 can therefore also be integrated in an activation path for the valve device 330. The error protection module 440 comprises, for example, a Y plug-in connector system with integrated diodes 464, 474, 484 and fuses 462, 472, 482 in a combined housing. All possible types of plug-in connectors can be used. In the event of a defect, the error protection module 440 can be exchanged in a simple manner or individual fuses 462, 472, 482 can be replaced.

THE LIST OF REFERENCE SIGNS IS AS FOLLOWS

100 System; in particular braking system
110 Actuators
GND1 Common ground
GVR1 Main port
L Inductance
PCV1_IV Supply port
PCV1_OV Supply port
PCV2_IV Supply port
PCV2_OV Supply port
ECU1 First control unit
R Resistance
ECU2 Second control unit
UB1 First supply potential
UB2 Second supply potential
200 System; in particular braking system
210 Actuators
D Diode
F Fuse
300 Vehicle
305 System; in particular braking system
310 First control unit
320 Second control unit
330 Valve device
435 Valve housing
440 Error protection module
441 First supply port
442 Second supply port
443 Third supply port
444 Fourth supply port
445 First main port
446 Second main port
447 First connection port
448 Second connection port
449 Further connection port
450 Valve unit
452 Actuator
454 Further actuator
460 First electric protective circuit
462 Electrical fuse device
464 Diode element
470 Second electric protective circuit
472 Electrical fuse device
474 Diode element
480 Further electric protective circuit
482 Electrical fuse device
484 Diode element
L Inductance
R Resistance

What is claimed is:

1. A valve device for a system for a vehicle, the system having a first control unit and a second control unit, wherein the control units are electrically connectable or connected to the valve device, comprising:
a valve unit for setting a pressure of a working medium for the system, wherein the valve unit has at least one actuator for actuating the valve unit;
a valve housing for accommodating the valve unit; and
an error protection module, which is arranged outside the valve housing, wherein the error protection module has a first supply port for the electrical attachment to the first control unit, a second supply port for the electrical attachment to the second control unit, a first main port for the electrical attachment to the first control unit, a second main port for the electrical attachment to the second control unit, a first connection port, which is electrically connected to the first supply port and to the second supply port, for the electrical connection to the actuator, a second connection port, which is electrically connected to the first main port and to the second main port, for the electrical connection to the actuator, a first electric protective circuit and a second electric protective circuit, wherein the first protective circuit is electrically connected between the first supply port and the second supply port, and the first connection port, wherein the second protective circuit is electrically connected between the second connection port, and the first main port and the second main port, wherein each of the protective circuits has at least one electrical fuse device and at least one diode element that are connected in series to the respective supply port or main port;
wherein the fuse device of the first protective circuit is connected between the first supply port and the first connection port, wherein the diode element of the first protective circuit is connected between the second supply port and the first connection port, wherein the fuse device of the second protective circuit is connected between the second connection port and the first main port, wherein the diode element of the second protective circuit is connected between the second connection port and the second main port.

2. The valve device of claim 1, wherein the actuator is attachable to a first electric supply potential of the first control unit via the first supply port and the first connection port, wherein the actuator is attachable to a second electric supply potential of the second control unit via the second supply port and the first connection port, wherein the actuator is attachable to a common electric ground potential of the control units via the second connection port and the first main port or via the second connection port and the second main port.

3. The valve device of claim 1, wherein a forward direction of the diode element of the first protective circuit runs from the second supply port to the first connection port, wherein a forward direction of the diode element of the second protective circuit runs from the second connection port to the second main port.

4. A valve device for a system for a vehicle, the system having a first control unit and a second control unit, wherein the control units are electrically connectable or connected to the valve device, comprising:
a valve unit for setting a pressure of a working medium for the system, wherein the valve unit has at least one actuator for actuating the valve unit;
a valve housing for accommodating the valve unit; and
an error protection module, which is arranged outside the valve housing, wherein the error protection module has a first supply port for the electrical attachment to the first control unit, a second supply port for the electrical attachment to the second control unit, a first main port for the electrical attachment to the first control unit, a second main port for the electrical attachment to the second control unit, a first connection port, which is electrically connected to the first supply port and to the second supply port, for the electrical connection to the actuator, a second connection port, which is electrically connected to the first main port and to the second main port, for the electrical connection to the actuator, a first electric protective circuit and a second electric protective circuit, wherein the first protective circuit is electrically connected between the first supply port and the second supply port, and the first connection port, wherein the second protective circuit is electrically connected between the second connection port, and the first main port and the second main port, wherein at least one of the protective circuits has at least one electrical fuse device and/or at least one diode element that are connected in series to the respective supply port or main port;
wherein the valve unit has at least one further actuator for actuating the valve unit, wherein the second connection port of the error protection module is electrically connectable or connected to the further actuator, wherein the error protection module has at least one third supply port for the electrical attachment to the first control unit, at least one fourth supply port for the electrical attachment to the second control unit, at least one further connection port, which is electrically connected to the third supply port and the fourth supply port, for the electrical connection to the further actuator, and at least one further protective circuit, wherein the further protective circuit is electrically connected between the third supply port and the fourth supply port, and the further connection port.

5. The valve device of claim 4, wherein the fuse device of the further protective circuit is connected between the third supply port and the further connection port, wherein the diode element of the further protective circuit is connected between the fourth supply port and the further connection port.

6. The valve device of claim 4, wherein the further actuator is attachable to the first electric supply potential via the third supply port and the further connection port, wherein the further actuator is attachable to the second electric supply potential via the fourth supply port and the further connection port.

7. The valve device of claim 4, wherein the first supply port, the second supply port, the third supply port and/or the fourth supply port represent a supply voltage port, and the first main port and second main port represent a ground potential port, and/or wherein the first supply port, the second supply port, the third supply port and/or the fourth supply port represent a ground potential port, and the first main port and second main port represent a supply voltage port.

8. The valve device of claim 4, wherein the error protection module is exchangeable.

9. The valve device of claim 4, wherein the fuse devices of the protective circuits are arranged exchangeably in the protective circuits and/or at least one of the protective circuits is exchangeable.

10. The valve device of claim 4, including cut-resistant, fireproof and/or corrosion-resistant cables for connecting the valve unit and the error protection module to one another.

11. A braking system for a vehicle, comprising:
a first control unit;
a second control unit; and
a valve device, wherein the control units are electrically connectable or connected to the valve device, including:
   a valve unit for setting a pressure of a working medium for the system, wherein the valve unit has at least one actuator for actuating the valve unit;
   a valve housing for accommodating the valve unit; and
   an error protection module, which is arranged outside the valve housing, wherein the error protection module has a first supply port for the electrical attachment to the first control unit, a second supply port for the electrical attachment to the second control unit, a first main port for the electrical attachment to the first control unit, a second main port for the electrical attachment to the second control unit, a first connection port, which is electrically connected to the first supply port and to the second supply port, for the electrical connection to the actuator, a second connection port, which is electrically connected to the first main port and to the second main port, for the electrical connection to the actuator, a first electric protective circuit and a second electric protective circuit, wherein the first protective circuit is electrically connected between the first supply port and the second supply port, and the first connection port, wherein the second protective circuit is electrically connected between the second connection port, and the first main port and the second main port, wherein each of the protective circuits has at least one electrical fuse device and at least one diode element that are connected in series to the respective supply port or main port;
wherein the fuse device of the first protective circuit is connected between the first supply port and the first connection port, wherein the diode element of the first protective circuit is connected between the second supply port and the first connection port, wherein the fuse device of the second protective circuit is connected between the second connection port and the first main port, wherein the diode element of the second protective circuit is connected between the second connection port and the second main port.

* * * * *